United States Patent
Wang

(10) Patent No.: US 8,358,425 B2
(45) Date of Patent: Jan. 22, 2013

(54) IMAGE CAPTURING DEVICE WITH INTERNAL PRINTER

(75) Inventor: Tsung-Chin Wang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 551 days.

(21) Appl. No.: 12/699,838

(22) Filed: Feb. 3, 2010

(65) Prior Publication Data

US 2011/0069185 A1 Mar. 24, 2011

(30) Foreign Application Priority Data

Sep. 24, 2009 (CN) .......................... 2009 1 0307615

(51) Int. Cl.
*G06F 3/12* (2006.01)
*H04N 1/04* (2006.01)

(52) U.S. Cl. ......................................... 358/1.1; 358/474
(58) Field of Classification Search .................... 358/1.1, 358/1.8, 1.13, 1.15, 474, 401, 418, 449, 462, 358/494, 302; 348/207.2; 399/122, 124; 396/30, 31

See application file for complete search history.

(56) References Cited

U.S. PATENT DOCUMENTS

| 6,317,561 | B1 * | 11/2001 | Kniazzeh et al. | ............... 396/30 |
| 7,286,260 | B2 * | 10/2007 | Silverbrook | ................... 358/1.8 |
| 7,366,351 | B2 * | 4/2008 | Walmsley et al. | ............ 382/167 |
| 2002/0031342 | A1 | 3/2002 | Sasaki | |
| 2007/0109611 | A1 * | 5/2007 | Silverbrook | .................. 358/474 |

* cited by examiner

*Primary Examiner* — Gabriel Garcia
(74) *Attorney, Agent, or Firm* — Altis Law Group, Inc.

(57) ABSTRACT

An image capturing device with internal printer includes a main body and a cover. The main body defines a receiving space with an opening on a surface thereof. The receiving space is configured for receiving printing papers, the size of the opening is larger than that of the printing papers. The cover is movable on the surface of the main body for covering the receiving space.

10 Claims, 4 Drawing Sheets

IMAGE CAPTURING DEVICE WITH INTERNAL PRINTER

BACKGROUND

1. Technical Field

The present disclosure relates to image capturing devices and, particularly, to an image capturing device with an internal printer.

2. Description of Related Art

Conventionally, an image capturing device with a printer is capable of printing out images stored in its memory. Typically, these image capturing devices have a casing with an entry slot defined on a side surface thereof. Printing paper can be inserted into the image capturing device through the entry slot. However, if the printing paper is too soft, the printing paper would be cockled during being inserted into the image capturing device from the entry slot.

What is needed is an image capturing device with an internal printer to overcome or at least mitigate the above described problem.

BRIEF DESCRIPTION OF THE DRAWINGS

Many aspects of the present image capturing device can be better understood with reference to the accompanying drawings. The components in the drawings are not necessarily drawn to scale, the emphasis instead being placed upon clearly illustrating the principle of the image capturing device. In the drawings, all the views are schematic.

DETAILED DESCRIPTION

Embodiments of the present disclosure will now be described in detail below, with reference to the accompanying drawings.

Figure 1:
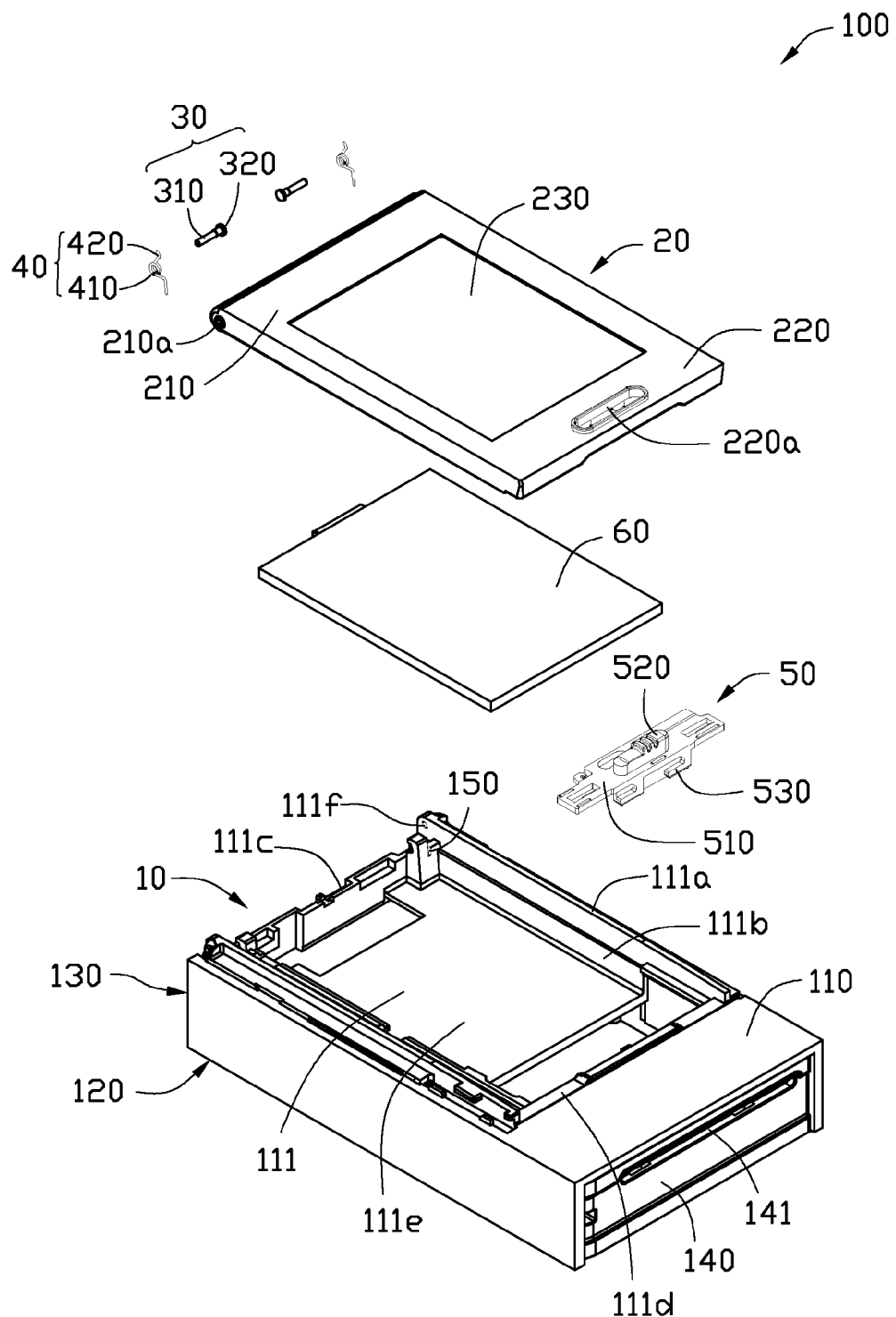
FIG. 1 is an exploded, isometric view of the image capturing device according to an exemplary embodiment.
Figure 2:
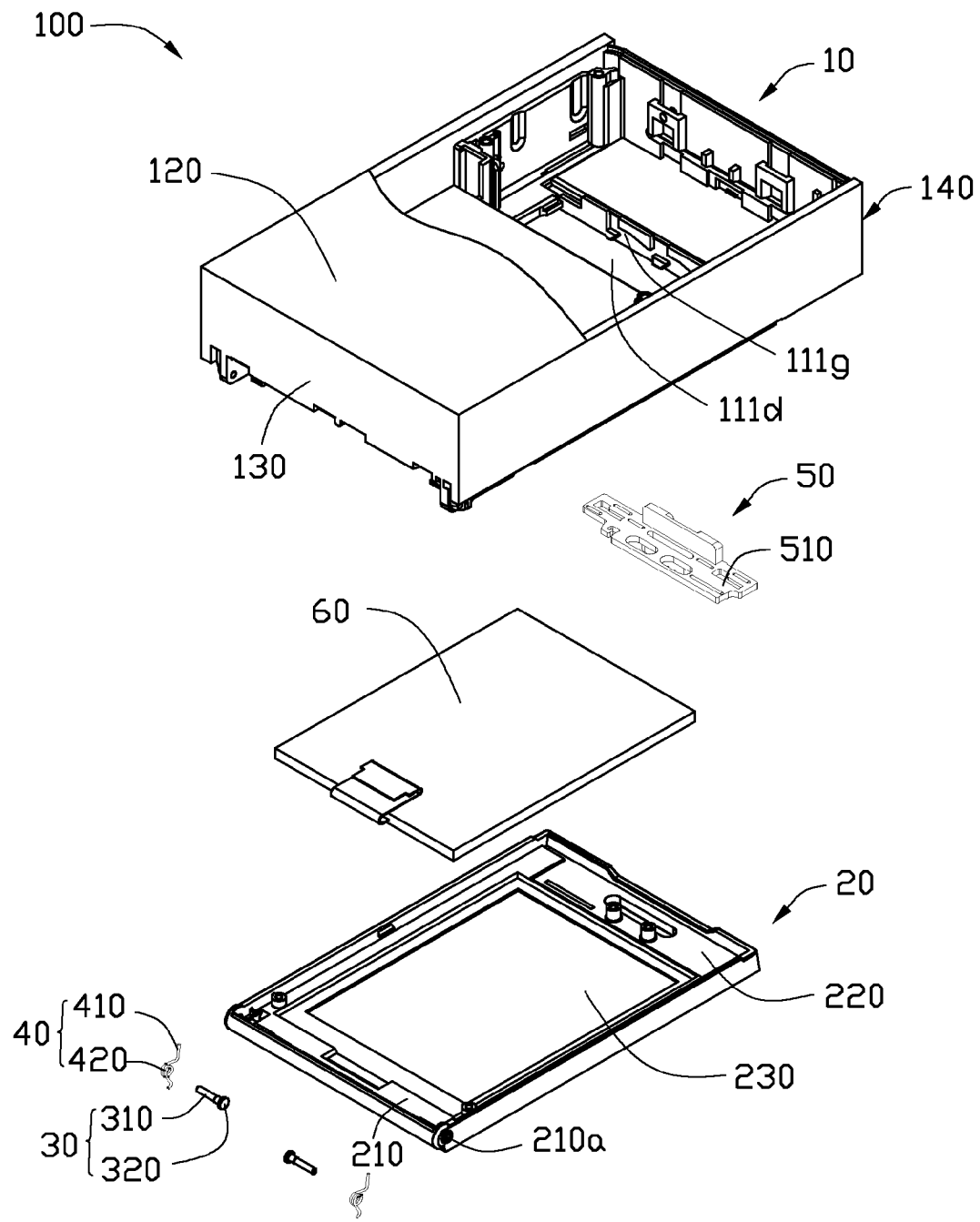
FIG. 2 is an exploded, isometric view of the image capturing device of FIG. 1, viewed from an opposite side.
Figure 3:
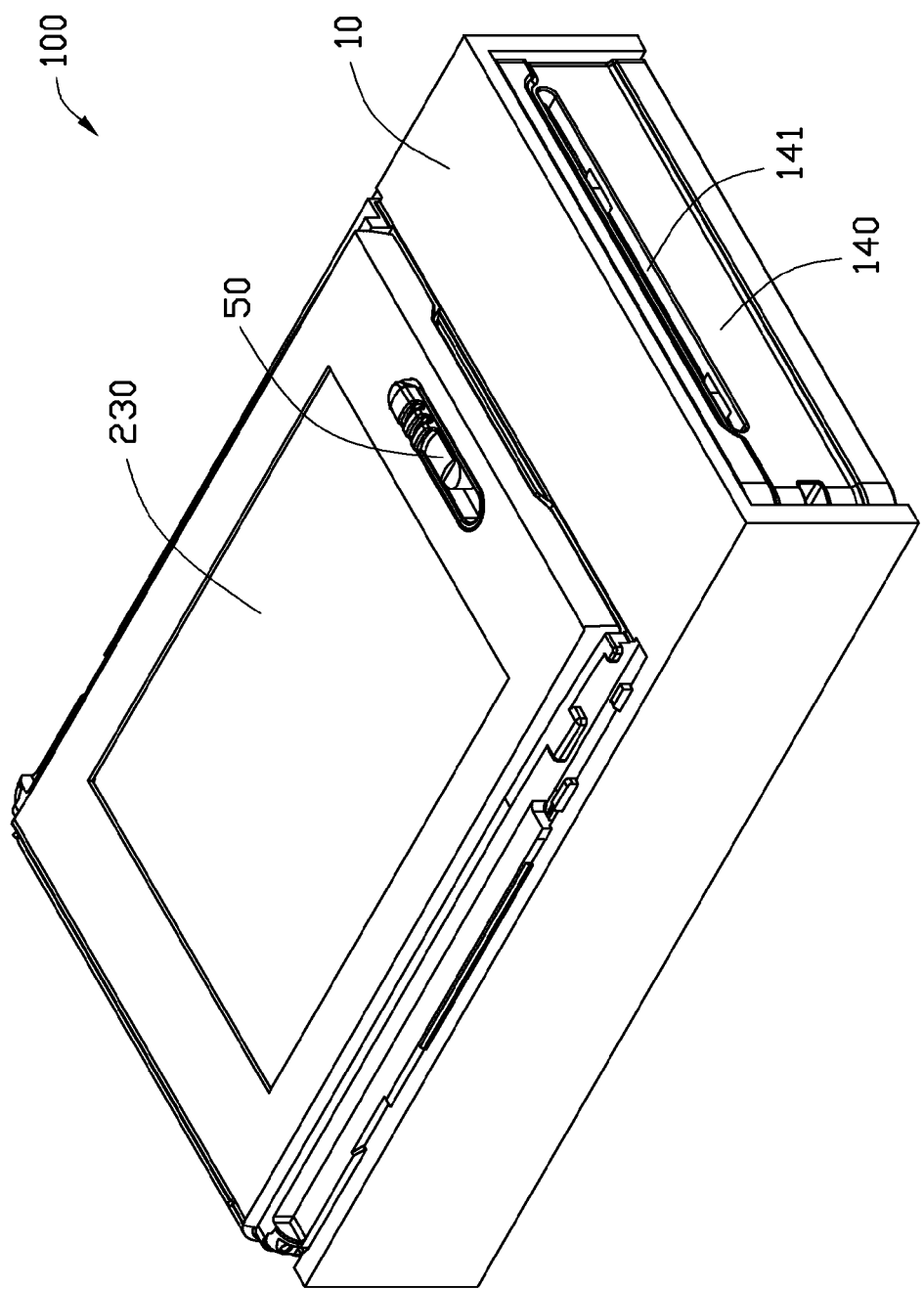
FIG. 3 is an assembled, isometric view of the image capturing device of FIG. 1.
Figure 4:
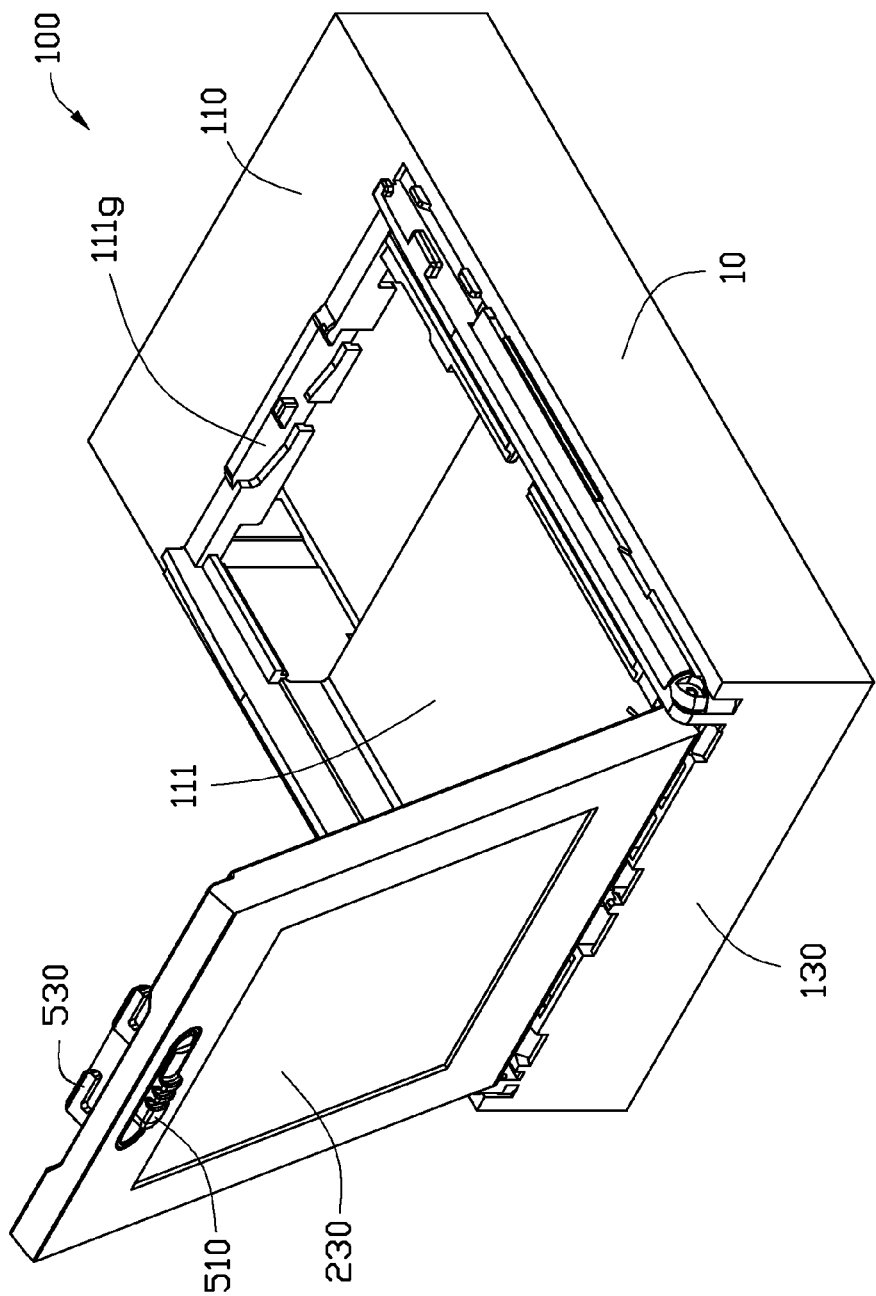
FIG. 4 is an isometric view of the image capturing device of FIG. 3 during feeding of printing paper into the image capturing device.

Referring to FIGS. 1 to 2, an image capturing device 100 with an internal printer (not shown) is shown. The image capturing device 100 can be a camera, a mobile phone, etc. The image capturing device 100 includes a main body 10, a cover 20, two rotating shafts 30, two torsion springs 40, a locking button 50, and a screen 60.

The main body 10 includes a front surface 110, a back surface 120 opposite to the front surface 110, a first end surface 130, and a second end surface 140 opposite to the first end surface 130. The first end surface 130 and the second end surface 140 connect the front surface 110 to the back surface 120. The second end surface 140 defines a paper output 141 for outputting the printed printing paper.

The main body 10 defines a receiving space 111 with an opening 111a on the front surface 110 of the main body 10. The receiving space 111 is bounded by two opposite first sidewalls 111b extending from the first end surface 130 towards the second end surface 140, a second sidewall 111c adjacent to the first end surface 130 of the main body 10, a third sidewall 111d adjacent to the second end surface 140 of the main body 10, and a bottom wall 111e. The receiving space 111 is configured for receiving printing paper therein.

The opening 111a is larger than the largest desired size of the printing paper to be used. Therefore, the printing paper can be fed into the receiving space 111 conveniently through the opening 111a without being cockled. The two first sidewalls 111b each define a shaft hole 111f adjacent to the second sidewall 111c. The two shaft holes 111f of the two first sidewalls 111b are substantially aligned with each other. The third sidewall 111d defines a latching slot 111g.

The cover 20 is used for covering the opening 111a of the receiving space 111. The cover 20 has a first end 210 and a second end 220 opposite to the first end 210. The first end 210 is pivotably connected to the main body 10. In the present embodiment, the first end 210 of the cover 20 defines two holes 210a corresponding to the two shaft holes 111f respectively. The two rotating shafts 30 each has a first end 320 fixed in the hole 210a and a second end 310 received in the shaft hole 111f. The two torsion springs 40 sleeve the two rotating shafts 30 respectively. Each torsion spring 40 includes a ring-shaped portion 410 and two claws 420 extending from the ring-shaped portion 410. The two claws 420 of each torsion spring 40 resist the second sidewall 111c and the cover 20 respectively. The cover 20 further defines a guide hole 220a at the second end 220 thereof.

The locking button 50 is assembled at the second end 220 of the cover 20 and is slidable relative to the cover 20. The locking button 50 includes a button body 510, an operating portion 520 extending towards the cover 20, and a hook 530 extending away from the cover 20. The operating portion 520 is received and slidable in the guide hole 220a. The hook 530 is latchable with the latching slot 111g on the third sidewall 111d by sliding the locking button 50.

In the present embodiment, the cover 20 further defines a view window 230.

The screen 60 is attached to an inner surface of the cover 20 facing the bottom wall 111e of the receiving space 111, and is exposed out from the view window 230.

It should be understood, the receiving space 111 could have an opening defined in the back surface 120 of the main body 10 instead of having the opening 111a defined in the front surface 110 of the main body 10. In other embodiments, the screen 60 can also be disposed on the back surface 120 of the main body 10 instead of being attached to the cover 20.

While certain embodiments have been described and exemplified above, various other embodiments will be apparent to those skilled in the art from the foregoing disclosure. The disclosure is not limited to the particular embodiments described and exemplified, and the embodiments are capable of considerable variation and modification without departure from the scope and spirit of the appended claims.

What is claimed is:

1. An image capturing device with internal printer, comprising:
    a main body defining a receiving space with an opening on a surface thereof, the receiving space being configured for receiving printing paper, the size of the opening being larger than that of the printing paper;
    a cover movably mounted on the surface of the main body for covering the receiving space, the cover comprising a first end;
    two rotating shafts fixed at two opposite sides of the first end of the cover, the two rotating shafts rotatable connected to the main body; and
    two torsion springs, each torsion spring comprising a ring-shaped portion and two claws, the ring-shaped portion sleeved over a respective one of the two rotating shafts, the two claws extending from the ring-shaped portion and resisting the cover and the main body respectively.

2. The image capturing device as claimed in claim 1, wherein the cover further comprises a second end opposite to the first end, the second end of the cover is latchable with the main body.

3. The image capturing device as claimed in claim 2, wherein a locking button is assembled at the second end of the cover and is slidable relative to the cover, the locking button comprises a button body, an operation portion extending towards the cover, and a hook extending away from the cover, the operation portion is exposed out of the cover, the hook is latchable with a latching slot on the main body by sliding the locking button.

4. The image capturing device as claimed in claim 3, wherein the second end of the cover defines a guide hole, the operation portion is received and slidable in the guide hole.

5. The image capturing device as claimed in claim 1, wherein the image capturing device further comprises a screen attached to an inner surface of the cover, the cover defines a view window corresponding to the screen, the screen is viewable from the view window.

6. The image capturing device as claimed in claim 1, wherein the image capturing device is a camera or a mobile phone.

7. An image capturing device with internal printer, comprising:
   a main body defining a receiving space with an opening on a surface thereof, the receiving space being configured for receiving printing paper, the size of the opening being larger than that of the printing paper;
   a cover movably mounted on the surface of the main body for covering the receiving space, the cover comprising a first end pivotably connected to the main body, the cover further comprising a second end opposite to the first end, the second end of the cover being latchable with the main body; and
   a locking button assembled at the second end of the cover and slidable relative to the cover, the locking button comprising a button body, an operation portion extending towards the cover, and a hook extending away from the cover, the operation portion being exposed out of the cover, the hook being latchable with a latching slot defined on the main body by sliding the locking button.

8. The image capturing device as claimed in claim 7, wherein the second end of the cover defines a guide hole, the operation portion is received and slidable in the guide hole.

9. The image capturing device as claimed in claim 7, wherein the image capturing device further comprises a screen attached to an inner surface of the cover, the cover defines a view window corresponding to the screen, the screen is viewable from the view window.

10. The image capturing device as claimed in claim 7, wherein the image capturing device is a camera or a mobile phone.

* * * * *